United States Patent
Hirota (10) Patent No.: US 6,839,902 B2
(45) Date of Patent: Jan. 4, 2005

(54) BROADCASTING RECEIVER FOR RECEIVING AND REGENERATING RECORDS OF DIGITAL BROADCASTING

(75) Inventor: Atsushi Hirota, Kanagawa-ken (JP)

(73) Assignee: Kabushiki Kaisha Toshiba, Kanagawa-ken (JP)

(*) Notice: Subject to any disclaimer, the term of this patent is extended or adjusted under 35 U.S.C. 154(b) by 12 days.

(21) Appl. No.: 10/422,800

(22) Filed: Apr. 25, 2003

(65) Prior Publication Data

US 2003/0185546 A1 Oct. 2, 2003

Related U.S. Application Data

(62) Division of application No. 09/426,189, filed on Oct. 25, 1999, now Pat. No. 6,577,806.

(30) Foreign Application Priority Data

Nov. 30, 1998 (JP) ............................................. 10-340020

(51) Int. Cl.[7] .............................................. H04N 5/445
(52) U.S. Cl. .............................. 725/37; 386/83; 386/95; 725/142
(58) Field of Search .............................. 725/37, 38, 40, 725/45, 47, 44, 50, 142, 39; 345/719, 717, 716; 386/46, 83, 95

(56) References Cited

U.S. PATENT DOCUMENTS

| 5,479,266 A | | 12/1995 | Young et al. |
| 5,543,933 A | * | 8/1996 | Kang et al. .................... 725/39 |
| 5,638,443 A | | 6/1997 | Stefik et al. |
| 5,745,756 A | | 4/1998 | Henley |
| 5,761,371 A | | 6/1998 | Ohno et al. |
| 5,796,828 A | | 8/1998 | Tsukamoto et al. |
| 6,002,394 A | * | 12/1999 | Schein et al. ................... 725/39 |
| 6,577,806 B1 | * | 6/2003 | Hirota ............................ 386/83 |
| 2004/0078815 A1 | * | 4/2004 | Lemmons et al. .............. 725/47 |

FOREIGN PATENT DOCUMENTS

| JP | 9-191453 | | 7/1997 | |
| WO | WO 9222983 | * | 12/1992 | .......... H04N/5/781 |

* cited by examiner

Primary Examiner—Vincent Boccio
(74) Attorney, Agent, or Firm—Pillsbury Winthrop LLP (57) ABSTRACT

A broadcasting receiver for setting beforehand, a threshold of free disk space of a file system on a Hard Disk Drive (HDD), detection of record termination of a specified program investigates the free disk space of the HDD. The present free disk space is compared with the threshold level of free disk space set up beforehand. If the present free disk space is smaller than the threshold level, a message indicating the free disk space has decreased is displayed automatically, and, if necessary, the present free disk space is displayed simultaneously.

5 Claims, 8 Drawing Sheets

| ATTRIBUTE OF FILE | EXPIRY DATA |
|---|---|
| 0 | EXPIRED |
| 1 | 1 DAY |
| 2 | 2 DAYS |
| ⋮ | ⋮ |
| 7 | 7 DAYS |
| ⋮ | ⋮ |
| 14 | 14 DAYS |
| 15 | INFINITE |

AFTER RECORDING, DO YOU TRANSFER THE FILE ?

YES     NO

FIG. 9

DO YOU DELETE THE FILE CARRIED OUT PLAYBACK ?

YES     NO

BROADCASTING RECEIVER FOR RECEIVING AND REGENERATING RECORDS OF DIGITAL BROADCASTING

This is a Divisional Application of U.S. application Ser. No. 09/426,189 filed Oct. 25, 1999 now U.S. Pat. No. 6,577,806 the entirety of which is hereby incorporated by reference.

BACKGROUND OF THE INVENTION (1) Field of the Invention

The present invention relates generally to broadcasting receiver which performs reception and record regeneration of digital broadcasting and, more particularly, to digital-broadcasting integrated receiver decoder having mass storage media in which many files with big amount of information are stored.

(2) Description of the Related Art

In digital broadcasting, it can many channelize by coding and packetizing signal with various service arrangements such as video, audio, and data, and carrying out multiplex transmission of those. About coding methods and these multiplexing methods of video and audio, there is Moving Picture Experts Group 2 (MPEG-2) which is international standardized specification.

As an example which applied such MPEG specification to digital-broadcasting system, Digital Video Broadcasting (DVB) standard upon which it was decided in Europe is actually mentioned. DVB standard is widely recruited in every country in the world now as an industry de facto standard in each digital-broadcasting method of satellite/cable/ground.

Especially, with regard to multiplexing method, application extension of the Transport Stream (TS) which is multiple-signal form of MPEG-2 Systems is carried out. In TS specification of MPEG-2 Systems, Transmission format of demultiplexing information called Program Specific Information (PSI) being capable of describing structure of two or more multiplexed programs is specified, and PSI is multiplexed in the form of fixed-length packet with video, audio, etc.

In addition to PSI, at DVB, the transmission format of related information of broadcast service at large called Service Information (SI) is specified in form based on TS specification of MPEG-2 Systems and SI is multiplexed. In receiving side, user can be provided with various functions by acquiring and using these information.

Now, especially integrated receiver decoder that receives and processes such a digital broadcasting signal is called set top box or Integrated Receiver Decoder (IRD). Then, in case of digitally recording contents of digital broadcasting, the IRD can be connected to storage media, such as Hard Disk Drive (HDD) and Digital Versatile Disk Random Access Drive Device (DVD-RAM) drive unit.

Since video signal is mainly dealt with for hours in digital broadcasting, generally the contents constitutes mass data of gigabyte order, and needs reservation of sufficient free disk space which balances this beforehand for mass storage media.

However, user does not notice deficiency of free disk space, data processing for reserving free disk space, even if user notices, such as selection of object file and backup, takes time and effort, user fails in record or there is threat of deleting required file accidentally.

As mentioned above, there is a problem that specified all contents is unrecordable, if capacity value which can be beforehand used for storage media is not fully secured in conventional digital broadcasting integrated receiver decoder. It is considered to digitally recording contents of digital broadcasting on storage media, such as HDD and DVD-RAM. Moreover, generally in digital broadcasting integrated receiver decoder, information of recorded program is abundant and each of recorded files is also large.

Therefore, even if storage media with very large recordable capacity was used, when not running efficiently, usable capacity become less easily and user's request of wanting recording favorite program and watching it anytime was not able to be complied.

SUMMARY OF THE INVENTION

There, main purpose of the invention is providing broadcasting receiver which suppresses amount of information recorded in storage media as much as possible by supervising recorded file and running it appropriately, and realizes user's request of wanting recording favorite program and watching it anytime.

Other purpose of the invention is providing broadcasting receiver which can reduce failure of record transaction which processes so that capacity in which use on storage media is possible may be secured beforehand, or promotes user's transaction efficiently and effectively, and originates in deficiency of capacity which can be used by this.

In order to attain the above-mentioned purposes, the broadcasting receiver by the present invention, comprises of:

program selection means for choosing signal of at least one program from digital broadcasting signals received, program record means for creating file or directory to storage media, and for recording the program chosen by said program selection means; related information administration means for controlling and updating information relevant to record and playback of the program recorded in the storage media by the program record means; and related information display control means for controlling display of the related information of record playback controlled and updated by the related information administration means. The alarm gives caution to user.

Moreover, related information administration means presents user related information effective in deletion or move using the attribute of file or directory of program. Thereby, user can secure free disk space now efficiently.

Furthermore, record program signal administration means checks almost periodically use status of storage media, and status of recorded file. Thereby, free disk space of storage media can be expanded now without user's annoyance.

DESCRIPTION OF THE PREFERRED EMBODIMENT

With reference to drawing, several forms of implementation of the present invention are explained in detail hereafter.

First, basic structure of digital broadcasting integrated receiver decoder (IRD) to which the invention is applied is explained with reference to FIG. 1.

Figure 1:
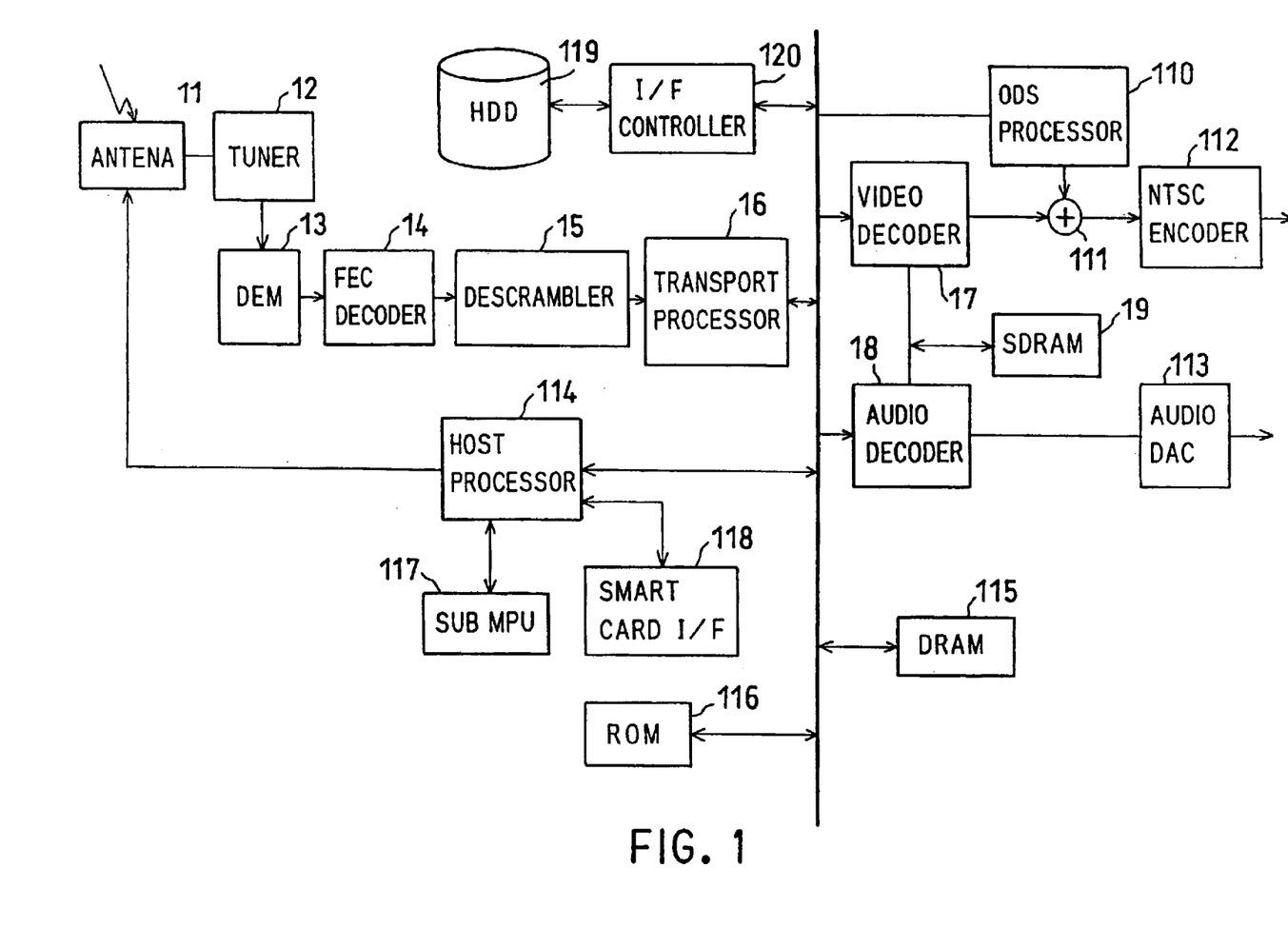
FIG. 1 is a block diagram of digital broadcasting integrated receiver decoder that implements the invention.

In FIG. 1, broadcast signal of RF received in antenna 11 is inputted into tuner 12. Tuner 12 chooses signal of predetermined transmission-frequency band, and outputs it to demodulator 13. After converting analog signal to digital signal, demodulator 13 demodulate digital signal modulated by digital modulation process in transmitting side, such as QAM and QPSK, and outputs it to FEC decoder 14.

After carrying out error correction of the input signal by forward error correction (FEC), FEC decoder 14 decodes signal coded by convolutional codings, such as Viterbi coding, Reed Solomon coding in transmitting side, and outputs decoded signal to descrambler 15. With scramble key, descrambler 15 descrambles the scrambled signal of video or audio of the specified program, and outputs it to transport processor 16. In transport processor 16, a desired service is chosen out of two or more services (broadcast program), which has been multiplexed in the form of TS in transmitting side, and demultiplexing of video or audio signal which comprise the service, is carried out, and depacket transaction is performed, and these signals return to compressed signals, and outputs to video decoder 17 or audio decoder 18.

Decode of the signal coded by video bandwidth-compression scheme of MPEG 2 while storing picture frame by which decryption was carried out to SDRAM 19, in MPEG video decoder 17 is carried out. Video decoder 17 outputs digital component signals Y, Cb, and Cr to NTSC encoder 112. In NTSC encoder 112, input signal is converted into analog composite signal, and is outputted to ordinary TV receiver (not shown).

When notifying user about warning or confirmation, control signal from transport processor 16 is inputted into OSD processor 110, and graphic image is created in OSD processor 110.

This graphic image is added to output of video decoder 17 in adder 111, and is outputted to NTSC encoder 112. In NTSC encoder 112, superposition transaction which piles up video and the above-mentioned graphic image is made, and it is displayed in piles on screen of TV receiving set. NTSC encoder 112 can be displaced to encoder encodes to video signal of other standards, such as PAL.

Audio data are decoded to data of MPEG audio standard, or data of AC3 audio standard in audio decoder 18. Audio decoder 18 outputs digital sound signal to audio digital-to-analog converter (DAC) 113, and audio DAC 113 converts input signal into analog sound signal, and, outputs it to above-mentioned TV receiver.

On the one hand, in order to control these signals appropriately, host processor 114, and Dynamic Random Access Memory (DRAM) 115 and Read Only Memory (ROM) 116 are prepared.

Sub MPU 117 which supports control of peripheral devices, such as remote control input of IRD, Smart Card interface 118, etc. are connected to host processor 114.

Host processor 114 performs control of demultiplexing transaction of specific program, exchanging Conditional Access (CA) system carried in IC card, and many data required for descramble transaction with descrambler 15 or transport processor 16, for example, through Smart Card interface 118. Codes of processing programs, such as the above-mentioned control of network, are stored in Read Only Memory (ROM) 116.

Information signals, such as PSI/SI extracted in transport processor 16, are outputted to DRAM 115. PS1/S1 information signals accumulated at DRAM 115 are analyzed by host processor 114, carry out decode of demultiplexing information or the program related information, carry out maintenance administration, and are used for Electronic Program Guide (EPG) displaying etc.

Hard Disc Drive unit (HDD) 119 is connected to bus line through interface controller 120, and is used for record and playback of broadcast signal. As shown in FIG. 1, HDD 119 may be built in IRD, and may be connected to bus line to host processor 114 through interface controller 120, or may connected to IRD through Input Output (I/O) port etc. externally. When IRD accepts instruction of real time recording or recording reserve from user, IRD records signal of specified program to HDD 119 through interface controller 120 as an output of transport processor 16, performing the above processes from tuning to demultiplexing.

Moreover, conversely, when playback instruction is accepted, recorded broadcast signal is inputted into transport processor 16 through interface controller 120 from HDD 119, and transaction from demultiplexing of specified program signal to decoding of video and audio signals is performed. Video and audio signals which are decoded are reproduced for TV receiver with related information if needed.

Signal data recorded by HDD 119 are controlled by file format of file system as a part of OS mounted on host processor 114. Therefore, record transaction of broadcast signal data constitutes write-in handling to file, playback transaction constitutes read-out handling from applicable file, and attribute information, such as recordable capacity of HDD 119, the time and date of record file, are controlled on file system with recorded data.

The above-mentioned series transaction is realized by application software firmware, or driver software, which operates on OS. Specifically in host processor 114, recordable capacity of HDD 119 etc. is detected.

When asking user, host processor 114 controls OSD processor 110, and displays comment of warning or confirmation on screen of TV receiver (not shown) connected to NTSC encoder 112. User's desire is interactively made by input to input units, such as remote controller (not shown). In IRD by the above-mentioned structure, embodiments of the invention are explained concretely below.

(Embodiment 1)

In this embodiment, when free disk space on file system of HDD 119 decreases, alarm display is performed. Transaction in case IRD investigates free disk space and carries out alarm display at the time of record end of certain program is described with reference to flow chart shown in FIG. 2.

Figure 2:
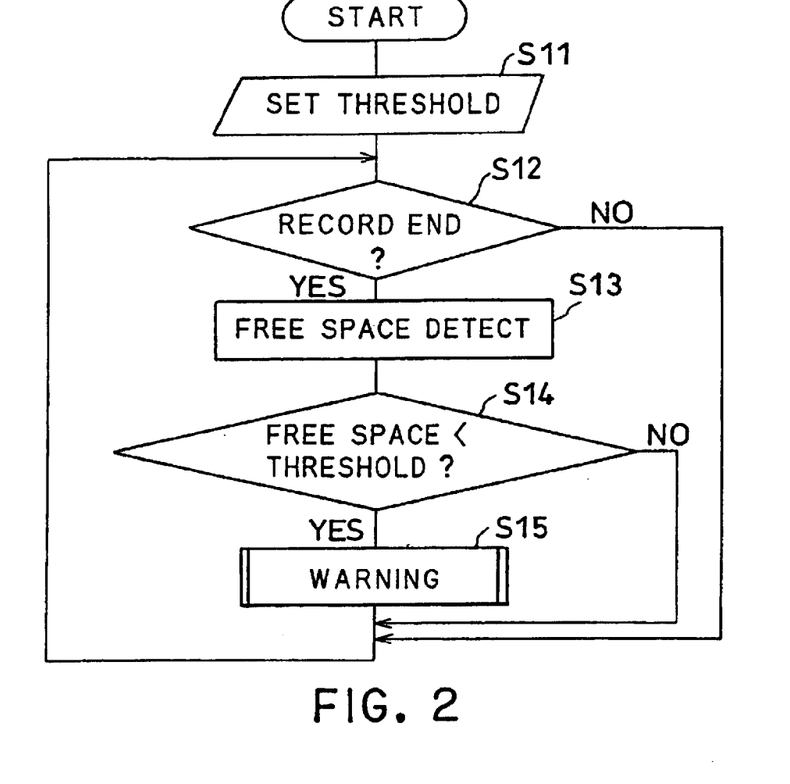
FIG. 2 is a flow chart which shows flowing of transaction of embodiment 1 concerning the invention.

In process (S11) of FIG. 2, threshold of free disk space of file system on HDD 119 is set up beforehand first. This threshold means critical free disk space of HDD 119.

Specifically, this value is previously set, for example, to 80% of HDD. By control from host processor 114, user is asked about whether 80% is sufficient on screen of TV receiver connected to this IRD through OSD processor 110, or how much it will be made if it is vary, and it urges to key input by remote controller, for example.

In process (S12), when host processor 114 of IRD detects record termination of program specified by user, host processor 114 investigates free disk space of file system of HDD 119 at the time, through interface controller 120, in process (S13). In process (S14), host processor 114 compares the free disk space of HDD at the time with threshold value of free disk space.

If free disk space of HDD in the time is smaller than threshold, the message which means that free disk space has decreased is displayed through OSD processor 110 in process (S15) of FIG. 1.

Figure 3:
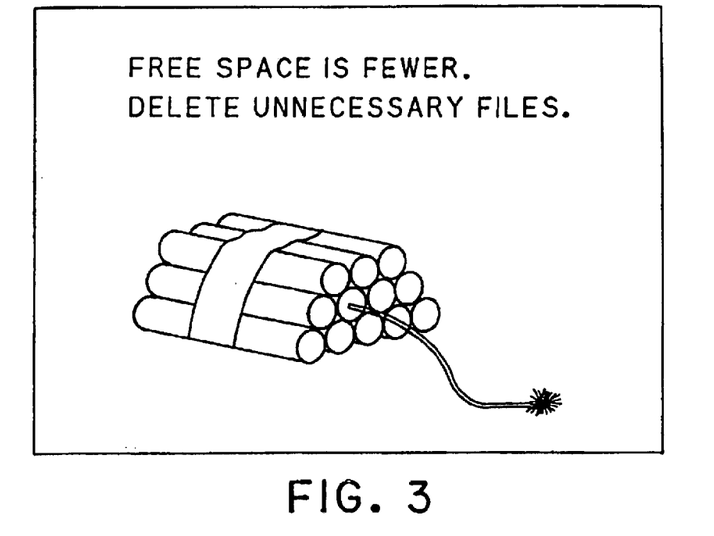
FIG. 3 is a drawing showing an example of display of the above embodiment 1.

In this case, you may display value of the present free disk space on screen of TV receiver at the same time. Example of this alarm display is shown in FIG. 3.

When record termination is not detected in process (S12), when present free disk space of file system is larger than threshold, it returns to position in front of process (S12), in process (S14).

In this embodiment, when free disk space decreases, by taking out alarm display of the notice to user, free disk space reservation can be demanded from user, and failure of program record by space deficiency can be made few.

In addition, although the above explanation took up HDD as a storage media, other storage media manageable by file system, such as DVD-RAM, can also be used.

(Embodiment 2)

This embodiment is an example which shows user the file which should be carried out, deletion or transmission among record files on HDD, in order to secure sufficient free disk space. IRD holds count of playback as an attribute information on recorded file, and always have updated and the count of playback as an attribute information is used.

Figure 4:
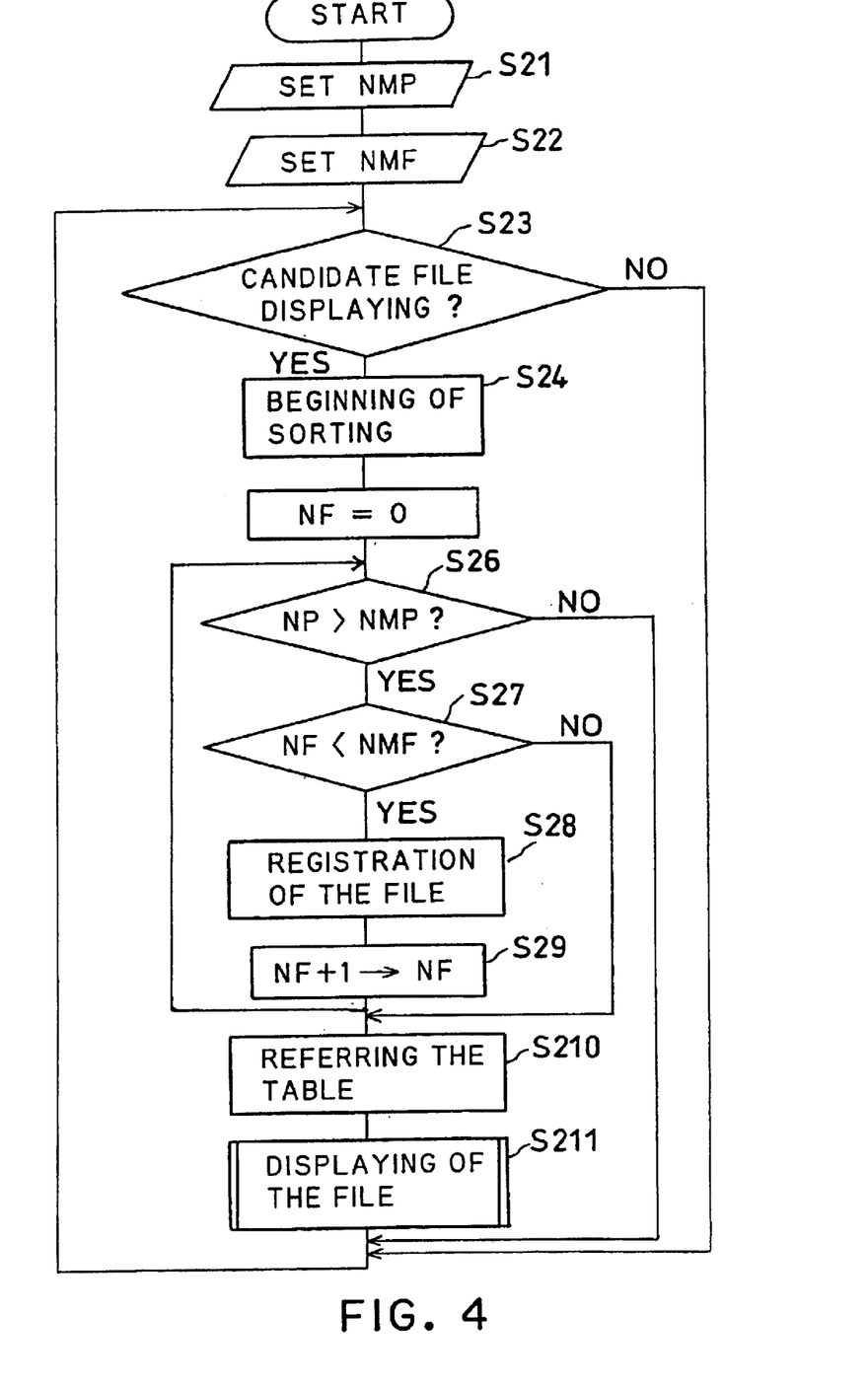
FIG. 4 is a flow chart which shows flowing of transaction of embodiment 2 concerning the invention.

Flow of this transaction is shown in FIG. 4. In FIG. 4, minimum count (NMP) of playback is beforehand set up in process (S21), and maximum number (NMF) of files which can be displayed is set up, in process (S22). As default value, for example, the minimum count (NMP) is set to 3, and the maximum number (NMF) is set to 5.

By control from host processor 114, through OSD processor 110, the count of playback (NMP), and the number of display files (NMF) are inquired of user on screen of TV receiver. If user expects different (NMP) or (NMF), user inputs the value to expect, from remote controller. Host processor 114 of IRD asks user whether candidate files which should be deleted or transmitted are displayed, in process (S23).

When user desires viewing of candidate files, all files on file system are arranged sequentially from what has many counts of playback, in serial transactions from process (S24).

First, the number (NF) of files which fulfills conditions of count of playback is zeroed, in process (S25). Next, in process (S26), compare judgment of whether the count (NP) of playback is larger than the minimum count (NMP) of playback about each file is carried out. In process (S27), the number (NF) is compared with the number (NMF) of the maximum display files.

When the number (NF) is smaller than the maximum number (NMF), in process (S28), for example, identifier of the file is registered into playback count managing table with the count (NP). Next, increment of the number (NF) of files which fulfills conditions of playback count is carried out in process (S29). Transaction goes back to process (S26), and next file is examined.

When the playback count (NP) is smaller than the threshold count (NMP) in process (S26), and when the number (NF) of files which fulfills conditions is smaller than the maximum number (NMF) in process (S27), increment is not carried out in process (S29).

Thus, files which playback count (NP) exceeds threshold (NMP) set up in process (S21) are selected within the limit of the number (NMF) of the maximum files set up in process (S22), and, for example, identifier of those files is registered into playback count managing table.

Figure 5:
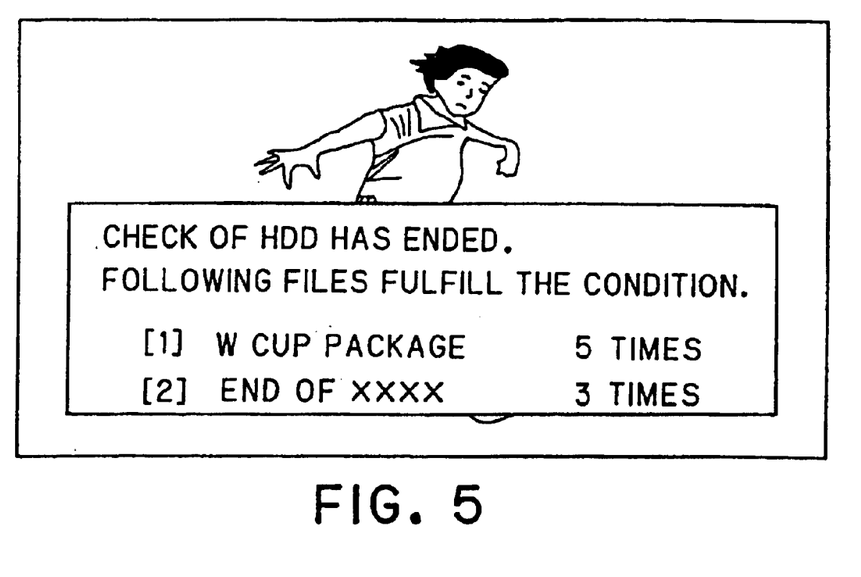
FIG. 5 is a drawing showing example of display of the above embodiment 2.

After this transaction is completed, host processor 114 shows user name of this applicable files etc. through OSD processor 110 in process (S211), referring to playback count managing table completed in process (S210). The example of display is shown in FIG. 5.

The example of display shows that there are two files which carry out playback 3 times or more. When not requesting display specification of applicable file in process (S23), or when playback count (NP) does not reach threshold (NMP) in process (S26), transaction returns to position before process (S23).

Moreover, when the number (NF) of files which implements conditions exceeds the number (NMF) of the maximum file displays in process (S27), at the time, registration to playback count managing table in process (S28) is stopped, and it shifts to reference of playback count managing table in process (S210). A series of file by which sorting was carried out to the order of playback count is once wholly registered into managing table, and files may be displayed in order by the number (NMF) of the maximum display files.

In this embodiment, when registered files reached the number (NMF), registration of files stopped. But, it is probable to display these files of the number (NMF) after completion of picking up files satisfying the condition of threshold (NMP).

As mentioned above, in this embodiment, by showing user file with many playback counts in order according to user's request, user can perform file curtailment or move transaction efficiently, and free disk space can be secured after all.

Although the above explanation took up HDD as a storage media, also in this embodiment, other storage media manageable in file system such as DVD-RAM etc. can be used.

Moreover, in this embodiment, although applicable file was shown according to user's request, you may show these files with alarm display free disk space is few, combining case of embodiment 1.

After presentation of applicable file, check displaying of whether deletion or transfer of applicable file is carried out is performed, and as long as user expects, you may be made to perform those transactions.

(Embodiment 3)

this embodiment is an example to periodically delete deletable files on HDD 119 in order to secure sufficient free disk space, without needing user's effort. Host processor 114 of IRD memorizes and updates expiry date (ED) of file as an attribute information on file recorded. This embodiment describes case where deletion process is carried out for every constant time using this expiry date.

Figure 6:
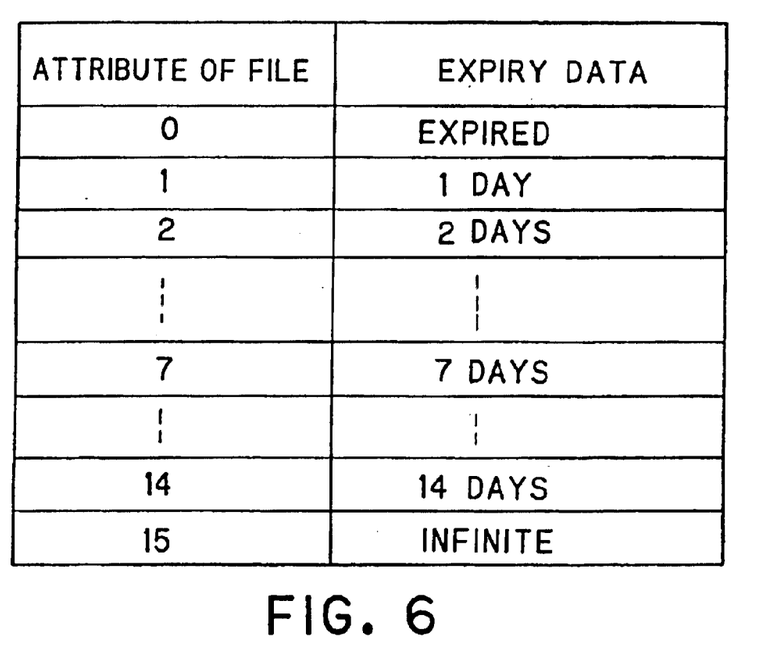
FIG. 6 is a drawing showing the attribute of expiry date of file used by embodiment 3 concerning the invention.

Expiry date of file is controlled, for example, per days using 4 bits as shown in FIG. 6.

When record file is created newly, seven days will be given automatically as a default value. And while date passes, decrement of this value is carried out. If expiry date (ED) of file becomes zero, host processor 114 deletes the applicable file as expiration. Expiry date of file can be changed by user.

For example, when host processor 114 controls OSD processor 110 when file is created newly, and default expiry date of this new file is superimposed over video on TV receiver, and whether it is proper in seven days is inquired. When user's desire differs, it urges user to input desirable expiry date from remote controller.

Figure 7:
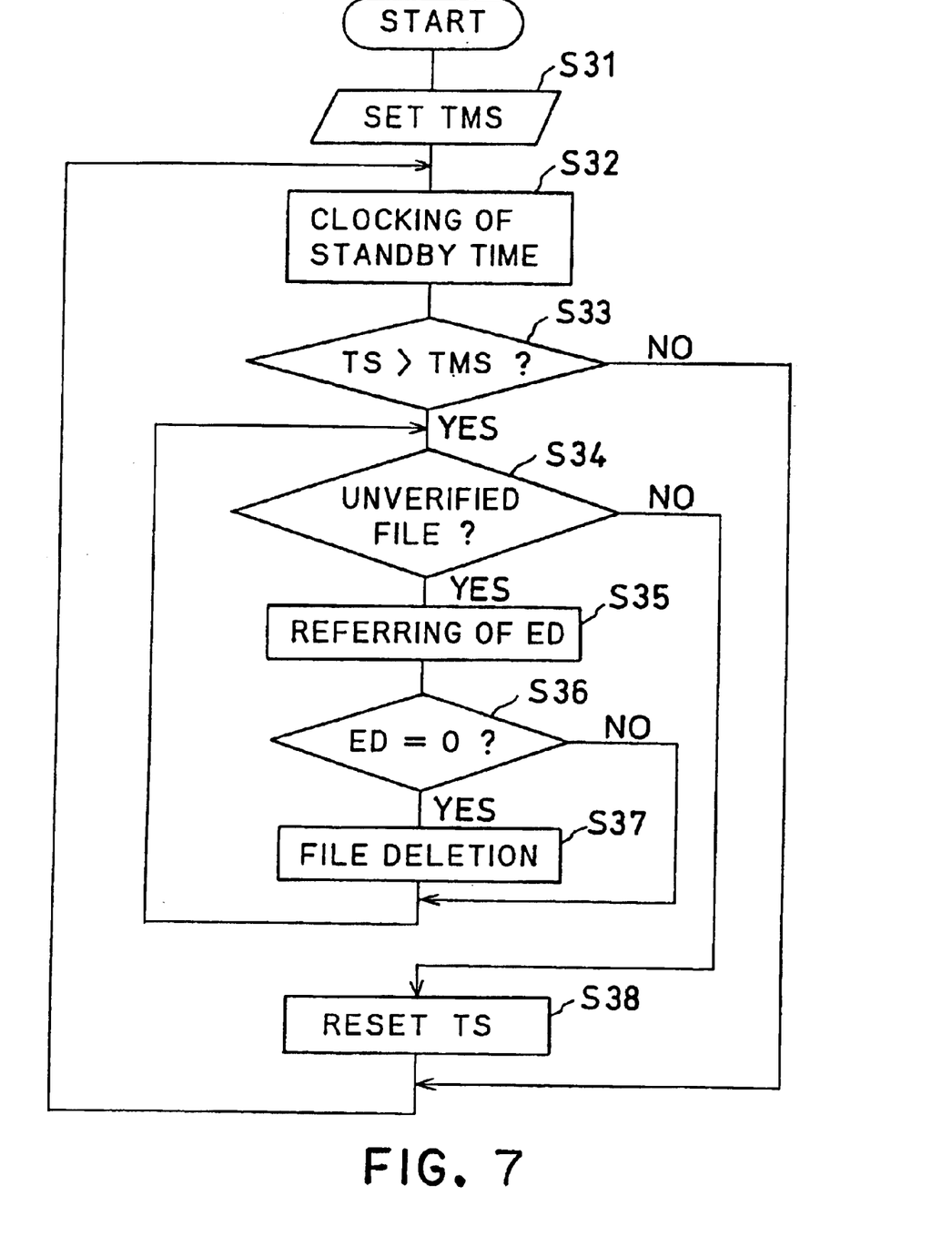
FIG. 7 is a flow chart which shows flowing of transaction of the embodiment 3 concerning the invention.

When user wants to hold the file on HDD 119 for the time being, expiry date can be set as indefinite period (value 15). User can also set up expiry date (ED) shorter than for seven days. Flowing of the transaction is shown in FIG. 7. Threshold of standby time (TMS), i.e., check up time interval of file, for example, 24 hours, is previously set up in process (S31), and standby time is clocked in process (S32).

Transaction detects file which can be deleted on file system and will delete predetermined time below according to process (S34) in process (S33), if it passes and standby time (TS) becomes larger than this threshold (TMS) is repeated. That is, if unverified file exists on file system in process (S34), the expiry date attribute of the file is referred to in process (S35).

When the value (ED) of a file is zero, i.e., expiry date passes, in process (S36), it judges that deletion of the file is possible and the file is deleted in process (S37). After repeating this transaction for all files on file system and completing this, standby time is reset in process (S38). In process (S33), when standby time (TS) does not reach standby time threshold (TMS), it returns to position before process (S32).

As mentioned above, in this embodiment, free disk space of HDD 119 can be efficiently secured by having function to which IRD performs deletion of unnecessary file periodically, without spending user's effort and time.

In addition, if user want confirmation of deleting the file having passed expiry date in advance, it can also set up so that it may do so. Such confirmation can prevent from deleting material file before user's notice.

Although the above explanation took up HDD as a storage media, other storage media controllable by file system, such as DVD-RAM, can also be used. The above-stated automatic delete function may be optional and user may choose the function.

(Embodiment 4)

This embodiment is an example which prevents depletion of free disk space produced by file neglect over long period of time after record, by checking whether it transmits to other media etc. immediately after record end at the time of record assignment by user.

Figure 8:
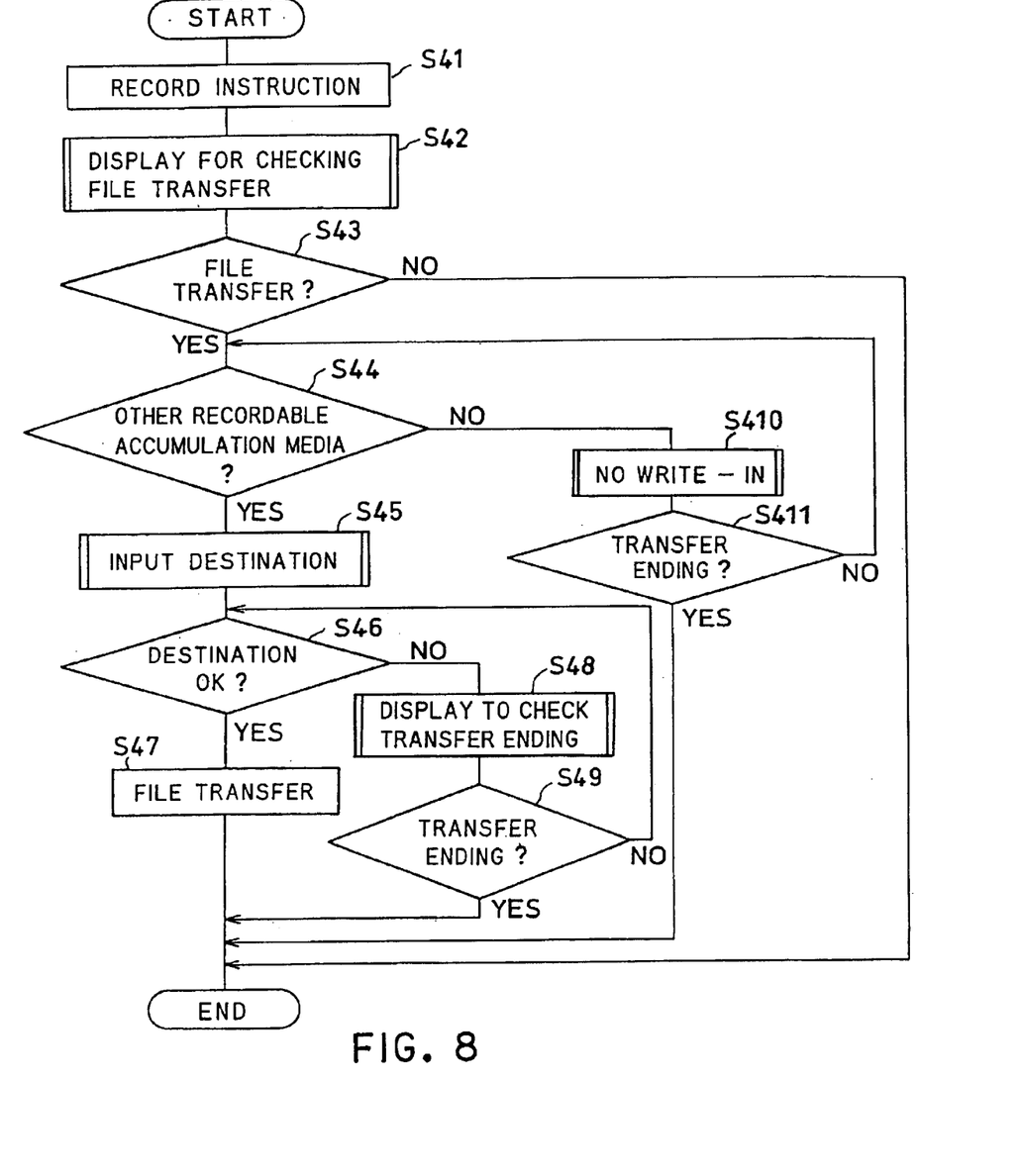
FIG. 8 is a flow chart which shows flowing of transaction of embodiment 4 concerning the invention.
Figure 9:
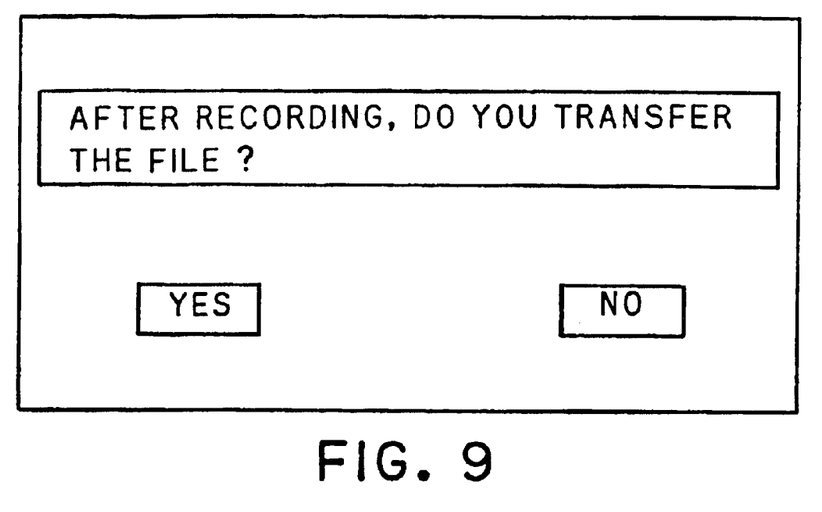
FIG. 9 is a drawing showing an example of display of embodiment 4.

Flowing of the transaction is shown in FIG. 8. First, in process (S41), host processor 114 of IRD accepts record instruction to record on videotape from user. In process (S42), host processor 114 controls to display graphic pattern shown in FIG. 9, etc. for checking file transfer on screen of TV receiver (not shown).

When transfer instruction of user is accepted with remote controller etc. in process (S43), whether the file system of other media can be written in is checked, in process (S44). For example, if it is case where it is storage (accumulation) media by which external connection of this is made, it will check whether the file system is recognized from IRD, or whether free disk space can be secured and write-in is permitted. If the storage media is written in, viewing which demands input of destination from user is performed in process (S45).

When two or more storage media can be written in, those storage media are displayed on screen of TV receiver, and to ask user so that selection decision of the either may be carried out by cursor key. If input destination is accepted in process (S46), file transfer transaction is performed in process (S47). In case of not accepting input of destination, it asks user for confirmation whether file transfer is quitted in process (S48). In process (S49), if user consents to file transfer termination with remote controller, transfer transaction is ended.

Moreover, when write-in is not made in process (S44), confirmation that write-in cannot carry out, and file transfer is terminated is displayed in process (S410). Transaction is ended if transfer termination is accepted in process (S411). Moreover, in process (S43), when there is no transfer designation, transaction is ended.

As mentioned above, by this embodiment, at the time of record assignment of user, host processor 114 of IRD can prevent depletion of free disk space produced by file neglect over long period of time after record, and can secure free disk space of HDD 119 by checking whether it transmits to other media etc. immediately after recording. Although the above explanation took up HDD as a storage media, other storage media controllable by file system, such as DVD-RAM, can also be used.

(Embodiment 5)

This embodiment is an example which prevents depletion of free disk space produced by file neglect over long period of time after record, by checking whether this file is immediately deleted and transmitted at the time of playback end of program.

Figure 10:
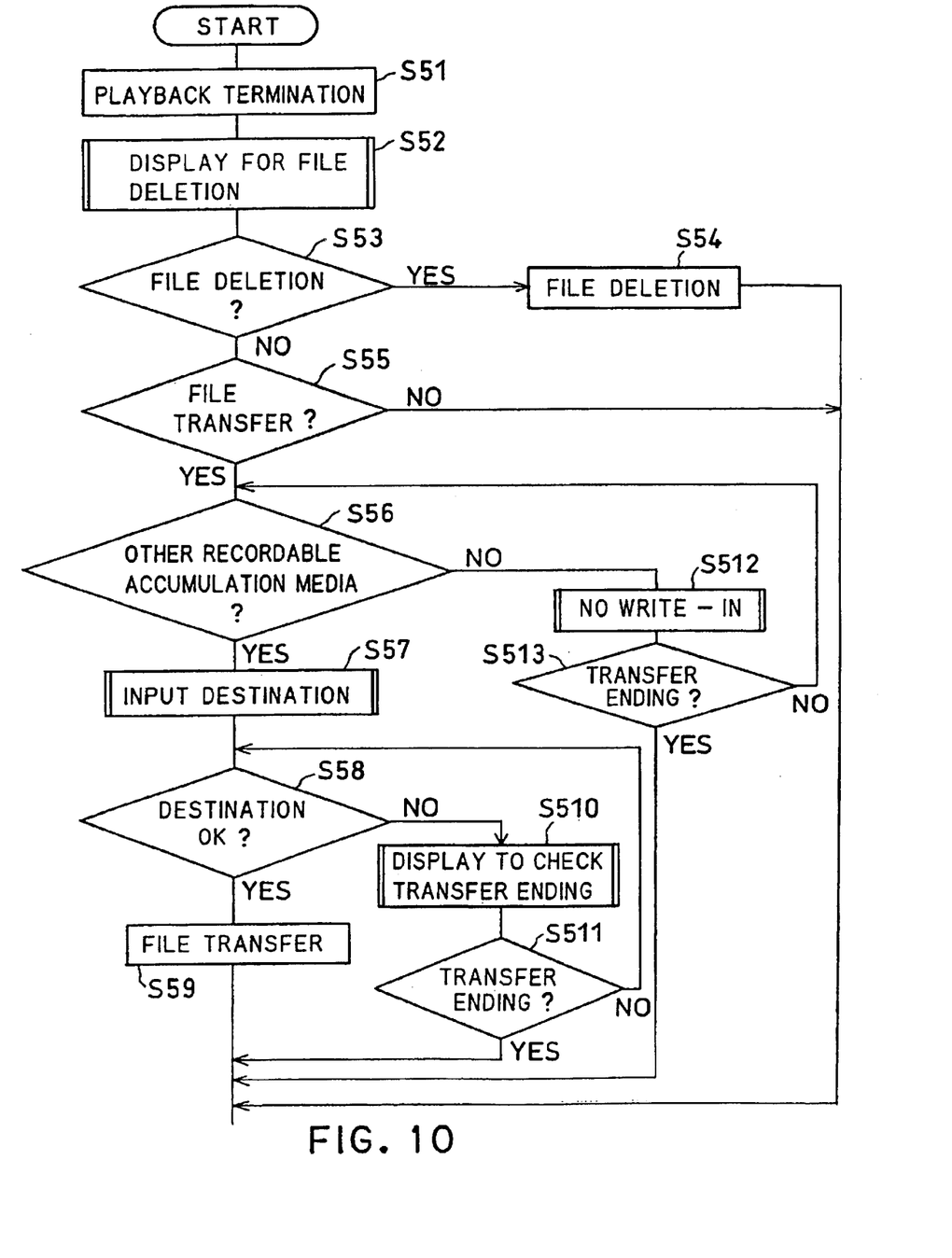
FIG. 10 is a flow chart which shows flowing of transaction of embodiment 5 concerning the invention.
Figure 11:
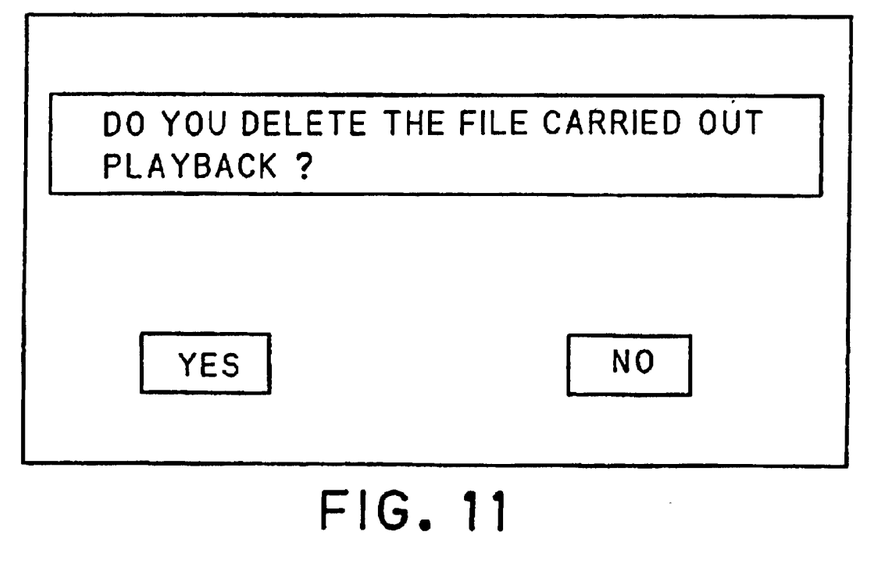
FIG. 11 is a drawing showing example of display of the embodiment 5.

Flowing of the transaction is shown in FIG. 10. In FIG. 10, first, if playback termination of program is detected in process (S51), host processor 114 of IRD will control OSD processor 110 in process (S52), and displays viewing of file deletion confirmed, shown in FIG. 11 on screen of TV receiver connected to this IRD. When user's deletion designation is accepted from remote controller etc. in process (S53), deletion transaction of file is actually performed in process (S54). Moreover, in not deleting applicable file, it asks user for confirmation by taking out file transfer check viewing which was shown in FIG. 9, on screen of TV receiver. In process (S55), when transfer designation from user is accepted, it checks whether write-in is possible for other file systems, such as other media in process (S56).

For example, if it is case where it is storage media by which external connection of this is made, it will check whether the file system is recognized from IRD, or free disk space can be secured and write-in permission is carried out. If write-in to this storage (accumulation) media is possible, in process (S57), viewing which demands input of destination from user is performed.

When there are two or more storage media in which write-in is possible, those storage media are displayed on screen of TV receiver, and it is possible to make user choose with cursor. If destination input is accepted in process (S58), file transfer transaction is performed in process (S59).

When not accepting destination input, check display of whether file transfer is quitted by process (S510) is carried out to user. When termination is accepted by user's selection input in process (S511), file transfer transaction is ended.

Moreover, when write-in is not made in process (S56), confirmation of the notice and file transfer termination is displayed in process (S512), and if transfer termination is accepted in process (S513), file transfer transaction will be ended. Moreover, in process (S55), when there is no transfer designation, the transaction is ended.

As mentioned above, by this embodiment, by IRD checking whether deletion or transfer to other media, etc. is immediately confirmed at the time of playback end of program, depletion of free disk space produced by file neglect over long period of time after record can be prevented, and free disk space of HDD 119 can be secured. Although the above explanation took up HDD as a storage media, other storage media controllable by file system, such as DVD-RAM, can also be used. In the invention, directory can substitute for file in which program is recorded.

In broadcasting receiver by the invention, transaction is processed so that free space on storage media may be secured previously, or transaction by user may be urged efficiently and effectively. Therefore, the present invention can provide broadcasting receiver which realizes user's request of wanting recording favorite program anytime and watching it.

Obviously, many, modifications and variations of this invention are possible in the light of the above teachings. It is therefore to be understood that within the scope of the appended claims, this invention may be practiced otherwise than as specifically described.

What is claimed is:

1. A broadcasting receiver comprising:

program selection means for choosing a signal of at least one program from received digital broadcasting signals;

program record means for creating a file or a directory in a storage media, and for recording said at least one program chosen by said program selection means;

related information administration means for controlling and updating at least one attribute of recordable space, expiry date, playback count and record time of the at least one program recorded by said record means related information display control means for controlling display of related information of record playback controlled and updated by said related information administration means; and performing means for performing deletion of said file or said directory selected by a user, wherein, said related information administration means sons a plurality of files or a directory of recorded programs in order of at least one attribute including at least one of record time, record volume, expiry date, or playback count, and designates said related information display control means to display the at least one attribute, and wherein said related information administration means administrates the expiry date of each program recorded in the storage media, and deletes the program which passes the expiry date, said expiry date being predetermined initially and changeable by a user.

2. A broadcasting receiver comprising:

program selection means for choosing a signal of at least one program from received digital broadcasting signals;

program record means for creating a file or a directory in a storage media, and for recording said at least one program chosen by said program selection means;

related information administration means for controlling and updating information relevant to record and playback of the at least one program recorded in said storage media by said program record means;

related information display control means for controlling display of related information of record playback controlled and updated by said related information administration means;

inquiry words display control means for controlling display of inquiry words regarding the at least one program controlled and updated by said related information administration means; and performing means for performing said program transaction when a displayed button is manipulated corresponding to said inquiry words;

wherein, said related information administration means sorts a plurality of files by a directory of recorded programs in order of at least one attribute including at least one of record time, record volume, entry date, or playback count, and designates said related information display control means to display the at least one attribute, and wherein said related information administration means administrates the expiry date of reach program recorded in the storage media and deletes the program which passes the expiry date, said expiry date being predetermined initially and changeable by a user.

3. The broadcasting receiver as claimed in claim 2, wherein said inquiry words display control means controls display of whether the at least one recorded program is transmitted to other storage media.

4. The broadcasting receiver as claimed in claim 3, wherein said inquiry words display control means controls the display of inquiry words so that a transmission inquiry may be displayed at a time of record reservation of the at least one program.

5. The broadcasting receiver as claimed in claim 3, wherein said inquiry words display control means controls the display of inquiry words so that a transmission inquiry may be displayed at a time of read-out of the at least one program.

* * * * *